UNITED STATES PATENT OFFICE.

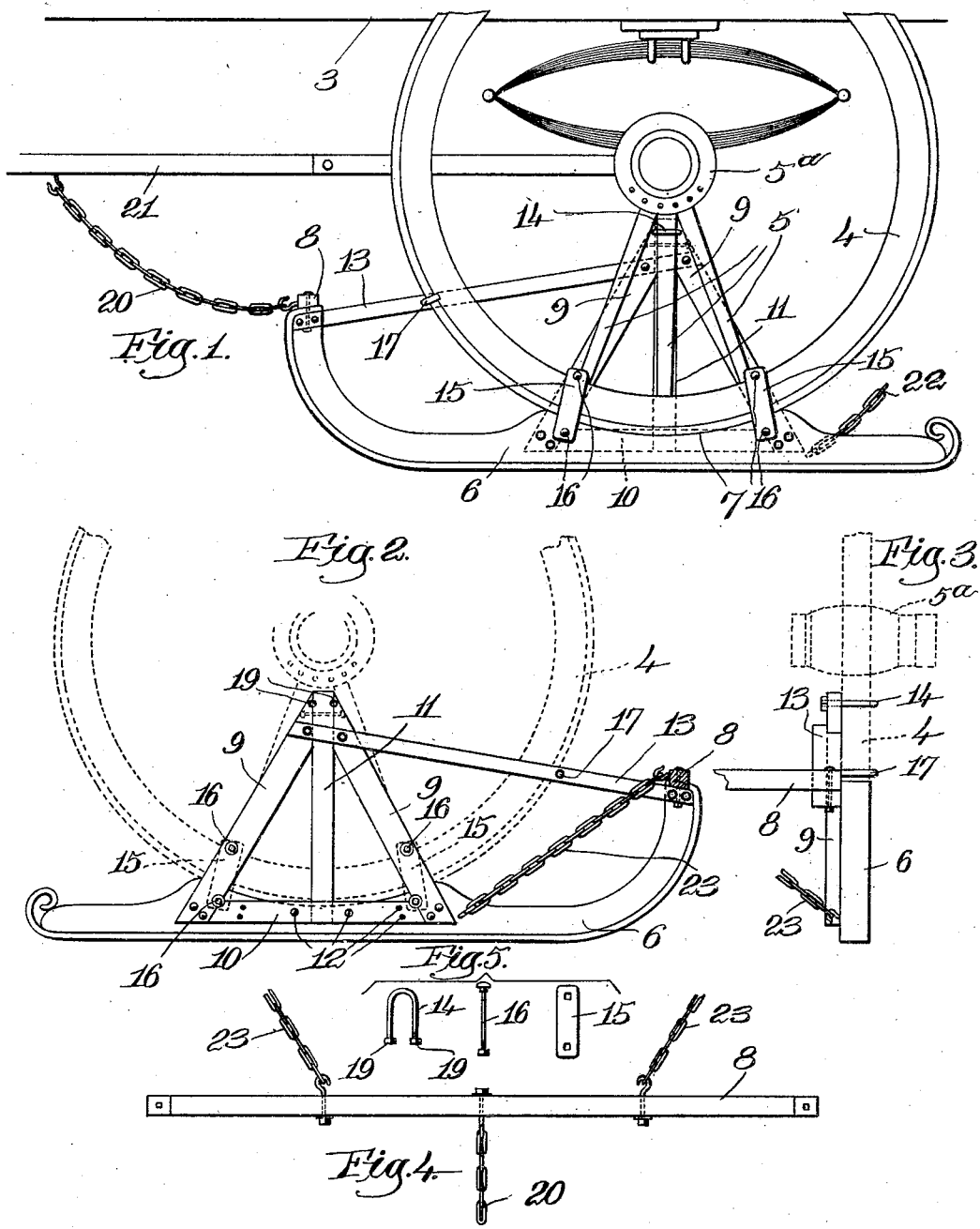

FREDRICK KINDAHL, OF CAMBRIDGE, MASSACHUSETTS.

RUNNER FOR WAGONS.

937,999.   Specification of Letters Patent.   Patented Oct. 26, 1909.

Application filed June 18, 1909. Serial No. 502,858.

*To all whom it may concern:*

Be it known that I, FREDRICK KINDAHL, a citizen of the United States, residing at Cambridge, county of Middlesex, and State of Massachusetts, have invented an Improvement in Runners for Wagons, of which the following description, in connection with the accompanying drawing, is a specification, like characters on the drawing representing like parts.

This invention relates to runners for wagons of that type which can be used without detaching the wheels from the wagon, and has for its object to provide a novel runner which can be easily applied to the wagon and which will be rigid enough to support the wagon even on uneven roads.

The invention will be more fully hereinafter described and then the novel features thereof pointed out in the appended claims.

In the drawings wherein I have shown the preferred embodiment of the invention, Figure 1 is a side view of the rear portion of a wagon showing my improved runner in operation; Fig. 2 is a view showing the inside of the runner; Fig. 3 is a front view of one of the runners; Fig. 4 is a detail view showing the cross-bar of the runners; Fig. 5 is a detail view showing the fastening devices used for securing the wheel to the runner.

In the drawings 3 designates generally a wagon of any suitable construction and 4 the rim of a wheel of the wagon, and 5 the spoke thereof.

6 is a runner which is provided with the chair or seat portion 7 in which the rim 4 of the wheel is adapted to rest. There will be, of course, one such runner for each of the wheels and the two runners for each pair of wheels are connected together by a cross piece 8 which extends from the front end of one runner to the front end of the other runner of the pair. Associated with each runner is a frame which stands parallel with the wheel and is adapted to be secured to the spokes thereof. In the present embodiment of this invention each of these frames is triangular in shape and comprises the two side pieces 9 and the bottom piece 10 connecting the side pieces and also the upright or center piece 11, these pieces being bolted or otherwise secured together to make a rigid triangular frame. The bottom piece 10 is secured to the side of the runner by screws or other fastenings 12, and the frame is preferably secured to the inside of the runner so that it overlies the inside of the wheel. The front of each runner is preferably connected to the top of the corresponding frame by a connection 13. At the upper end of each frame I provide a coupling 14 in the form of a clevis which is adapted to embrace one of the spokes 5 and which is firmly secured to the frame by nuts 19. The rim of the wheel is also secured to the frame by means of clamping plates 15 that overlie the outer side of the rim and are bolted to the frame by bolts 16. I preferably also provide the connection 13 with a hook-shaped member 17 which is adapted to embrace the tire or rim 4. By means of this construction each runner will be rigidly and securely fastened to its wheel and the wagon body will be as firmly supported on the runners as it is on the wheels.

When it is desired to remove the runners, the clevis 14 may be readily removed by removing the nuts 19 therefrom, and the clamping plates 15 may be removed by unscrewing the nuts from the bolt 16. The connections 17 may also be readily removed by unscrewing the nut from the shank thereof, and when this is done the runner is freed from the wheel and may be removed therefrom.

The operation of applying the runner to the wheel or removing it therefrom takes but a short time, in fact much less time than would be consumed in removing the wheels and placing runners on the axles, as is sometimes done.

I have shown a chain or other flexible connection 20 adapted to connect the cross piece 8 to the reach 21 of the wagon, and another chain or flexible connection 22 adapted to connect each runner with the rear end of the reach or with the rear end of the wagon body. The object of these flexible connections 20 and 22 is to limit the swinging movement of the runners about the axles. I have also shown chains or flexible connections 23 which extend from each runner near the center thereof to the cross bar 8 at a point some distance from the end thereof, the purpose of these connections 23 being to brace and stiffen the runner construction.

Having fully described my invention, what I claim as new and desire to secure by Letters Patent is:—

1. In a runner attachment for wagons, the combination with a runner having a chair or seat portion to receive a wheel, of a frame rising from the runner, a bar connecting the top of the frame with the front of the runner, means to clamp the frame to a spoke of the wheel, and other means to clamp the rim of the wheel to the frame.

2. In a runner attachment for wagons, the combination with a runner having a chair or seat portion to receive a wheel, of a frame rising from the runner, a bar connecting the top of the frame with the front of the runner, means to secure the upper portion of the frame to a spoke of the wheel, other means to secure the rim of the wheel to the frame, and a clamping device to clamp the rim of the wheel to said bar.

In testimony whereof, I have signed my name to this specification, in the presence of two subscribing witnesses.

FREDRICK KINDAHL.

Witnesses:
LOUIS C. SMITH,
THOMAS J. DRUMMOND.